United States Patent
Sieg

(10) Patent No.: US 11,838,074 B2
(45) Date of Patent: Dec. 5, 2023

(54) ARRANGEMENT FOR TRANSMITTING INFORMATION FOR A COMPONENT OF A VEHICLE

(71) Applicant: Huf Hülsbeck & Fürst GmbH & Co. KG, Velbert (DE)

(72) Inventor: Berthold Sieg, Bottrop (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 17/634,475

(22) PCT Filed: Aug. 11, 2020

(86) PCT No.: PCT/EP2020/072477
§ 371 (c)(1),
(2) Date: Feb. 10, 2022

(87) PCT Pub. No.: WO2021/028428
PCT Pub. Date: Feb. 18, 2021

(65) Prior Publication Data
US 2022/0321170 A1 Oct. 6, 2022

(30) Foreign Application Priority Data
Aug. 14, 2019 (DE) ...................... 10 2019 121 920.5

(51) Int. Cl.
*H04B 3/54* (2006.01)
(52) U.S. Cl.
CPC ....... *H04B 3/54* (2013.01); *H04B 2203/5416* (2013.01)
(58) Field of Classification Search
CPC .............. H04B 2203/5416; H04B 3/54; H04L 2012/40273; H04L 2012/40267;
(Continued)

(56) References Cited

U.S. PATENT DOCUMENTS

2015/0247889 A1 9/2015 Schroers et al.
2016/0369534 A1* 12/2016 Tabata ................... E05B 85/10
2017/0243423 A1* 8/2017 Schindler ................ H04L 12/40

FOREIGN PATENT DOCUMENTS

EP 3633866 A1 4/2020

OTHER PUBLICATIONS

First Office Action for Chinese Application No. 202080056821.0 dated Jul. 20, 2023, with its English translation, 20 pages.

* cited by examiner

*Primary Examiner* — David S Huang
(74) *Attorney, Agent, or Firm* — Bret E. Field; Bozicevic, Field & Francis LLP

(57) ABSTRACT

Arrangement (10) for transmitting information in a component (2) of a vehicle (1), in particular in a door handle (2) of the vehicle (1):
a processing arrangement (50) for providing information at the component (2), preferably about a detection of an activation action at the component (2),
an interface arrangement (40) for providing an electrical supply connection to a control device (30) of the vehicle (1),
a stabilizing device (20) electrically connecting the interface assembly (40) to the processing assembly (50) to provide a power supply from the supply connection stabilized to the processing assembly (50),
a current control arrangement (60) of the processing arrangement (50), which is electrically connected to the stabilizing device (20), for using the stabilizing device (20) to output a transmission signal (S) to the interface arrangement (40) in order to transmit the provided information to the control device (30) via the supply connection.

17 Claims, 8 Drawing Sheets

Figure 1:
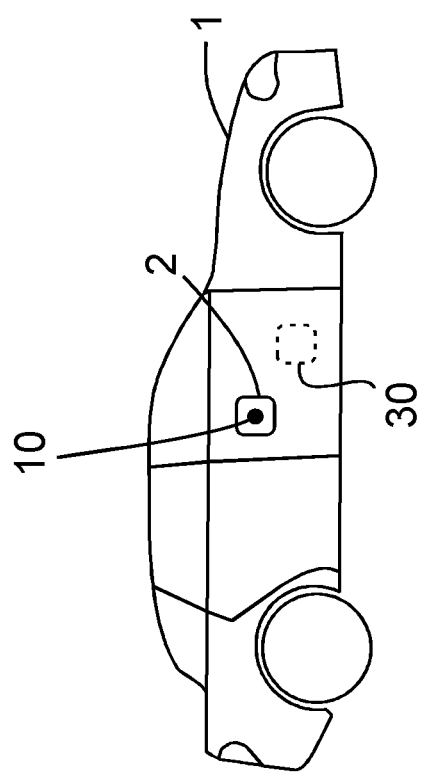

(58) Field of Classification Search
CPC ....... B60R 16/023; B60R 16/00; B60R 16/02; B60R 16/03
See application file for complete search history.

ARRANGEMENT FOR TRANSMITTING INFORMATION FOR A COMPONENT OF A VEHICLE

The present invention relates to an arrangement for transmitting information for a component of a vehicle. The invention further relates to a door handle, a system and a method.

It is known from the prior art that, in the case of components such as door handles of a vehicle, communication between a control unit and door handle electronics is provided in addition to a power supply. This communication is used, for example, to forward detection information from a door handle sensor to the control unit.

It is also known that dedicated lines are not used for this communication, but an already existing line is used for power supply. In this context, we also speak of powerline communication.

However, reliable communication requires that the communication signal output over the line meets certain requirements. For example, it may be necessary for the communication signal to correspond to a certain current strength and to deviate only slightly from this. Ensuring reliable communication is often associated with a higher technical effort.

It is therefore an object of the present invention to at least partially overcome the disadvantages described above. In particular, it is an object of the present invention to provide an improved solution for communication, preferably for outputting the communication signal. In this context, it is a further optional object to be able to determine and/or set the current intensity precisely.

The foregoing problem is solved by an arrangement having the features of the independent device claim, a door handle having the features of the further independent device claim, a system having the features of the independent system claim, and by a method having the features of the independent method claim. Further features and details of the invention will be apparent from the respective dependent claims, the description and the drawings. In this context, features and details described in connection with the arrangement according to the invention naturally also apply in connection with the door handle according to the invention, the system according to the invention as well as the method according to the invention, and vice versa in each case, so that with regard to the disclosure concerning the individual aspects of the invention, reference is or can always be made mutually.

The object is solved in particular by an arrangement, in particular a circuit arrangement, for transmitting information in a component of a vehicle.

Here, it is provided in particular that the component is designed as a door handle, in particular a vehicle door handle, such as, for example, a motor vehicle outer door handle or motor vehicle inner door handle, or a bumper or a monitoring device such as an optical sensor of the vehicle. Thereby, an arrangement according to the invention can be part of an electronic system of the component, in particular of a sensor, preferably a capacitive sensor, for proximity detection. The arrangement is thereby formed, for example, as a circuit arrangement with at least one electronic component and/or integrated circuit. A processing arrangement and/or a processing device of the arrangement can thereby be used, if necessary, for detecting the approach (of a user to vehicle or of a body part of a user to vehicle), for example evaluating a detection of a sensor electrode for detection.

The component may be such a component which is used for activating a function of the vehicle, such as locking/unlocking and/or opening/closing doors or flaps. For this purpose, for example, an activation action such as an approach of an object to the component and/or the execution of a gesture by the object is necessary. In this context, the object preferably concerns a person and in particular a body part of the person. The component may be embodied as such a component of the vehicle which primarily serves a purpose other than activating the function. This is the case, for example, with the door handle and the bumper. In contrast, a component such as the sensor may be dedicated to the activation of the function. The function is, for example, an unlocking of the vehicle and/or an initiation of an authentication.

It is also advantageous if the vehicle is designed as a motor vehicle, in particular as a hybrid vehicle or as an electric vehicle, preferably with a high-voltage electrical system and/or an electric motor. Furthermore, it may be possible that the vehicle is configured as a fuel cell vehicle and/or a passenger vehicle and/or a semi-autonomous or autonomous vehicle. Advantageously, the vehicle comprises a security system which enables authentication, for example by means of communication with an identification transmitter (ID transmitter). Depending on the communication and/or the authentication, at least one (possibly further) function of the vehicle can be activated. If the authentication of the ID transmitter is necessary for this purpose, the function may be a safety-relevant function, such as an unlocking of the vehicle or an opening of doors/flaps or an enabling of an engine start. Thus, the security system may also be designed as a passive access system which initiates authentication and/or activation of the function upon detection of the approach of the ID encoder to the vehicle without active manual actuation of the ID encoder. For this purpose, for example, a wake-up signal is repeatedly transmitted by the security system, which can be received by the ID transmitter upon approach, and then triggers the authentication.

Also, the function which is preferably activated by the component (in particular when the gesture is approached and/or performed on the component) may concern an activation of a vehicle light and/or an actuation (opening and/or closing) of a flap (e.g. front or rear or side flap or door). For example, the vehicle lighting is automatically activated upon detection of the approach and/or the flap is actuated upon detection of the gesture.

An arrangement according to the invention may be arranged at least partially on a printed circuit board in the component. For example, the arrangement comprises further subassemblies, each comprising at least one electronic component and/or at least one integrated circuit and/or at least one microcontroller and/or conductive tracks to interconnect said parts. These subassemblies may be mounted on the same or on different printed circuit boards.

An arrangement according to the invention may preferably comprise the following subassemblies:
- a processing arrangement for providing information at the component, preferably a detection of an activation action such as an approach to the component and/or a gesture, wherein the information may be specific to an activation of a function at the vehicle,
- an interface arrangement for providing an electrical supply connection to a control device of the vehicle,
- a stabilizing device electrically connecting the interface arrangement to the processing arrangement to provide a power supply from the supply connection stabilized to the processing arrangement,
- a current control arrangement of the processing arrangement, which is electrically connected, in particular connected, to the stabilizing device, in order to use the stabilizing device for outputting a transmission signal to the interface arrangement, in particular to activate and/or control it in order to transmit the information provided via the supply connection to the control device, in particular in accordance with a power line communication.

This has the advantage that the stabilizing device can be used to output the transmission signal, and thus the transmission signal can be output in a technically simple manner and in a particularly reliable manner and in particular in a stabilized manner. In this case, the stabilizing device is used for outputting the transmission signal, in particular activated and/or controlled. This is understood to mean in particular that, via the electrical interconnection, in particular electrical connection, of the current control arrangement to the stabilizing device, an electrical parameter of this interconnection is adapted in such a way that the stabilizing device is caused to output the transmission signal. This can be, for example, a change in the current intensity at this interconnection in order to output the transmission signal.

The transmission signal can be output, for example, by means of an (electrical) communication signal, in particular an electrical current with a specific current intensity, of the interface arrangement and/or supply connection. In this context, a current direction of the communication signal from the control device, in particular a control unit of the vehicle, via the supply connection and interface arrangement to the stabilizing device in the direction of the processing arrangement may be provided in order to provide the power supply. At the same time, however, the transmission signal may be transmitted from the direction of the processing arrangement from the stabilizing device via the interface arrangement and supply connection to the control device, that is, the direction of information transmission may be reversed from the processing arrangement to the control device. In other words, the transmission signal (as the information carrier for the provided information) may be output from the stabilizing device to the interface arrangement and thus to the control device via the supply connection to transmit the provided information to the control device in the corresponding direction. The transmission signal is output and transmitted, for example, by adjusting a parameter of the communication signal, such as the current intensity. The communication signal may be used primarily and/or predominantly for power supply and only secondarily and/or irregularly for communication, i.e. output of the transmission signal.

The arrangement can be part of an electronic system of the component, and thus be designed, for example, as a door handle electronic system. The arrangement obviously requires a power supply. This power supply is usually provided by a control device, in particular by a control unit and/or by a rechargeable battery of the vehicle. However, it is advantageous if the power supply provided by the control device is further stabilized by a stabilizing device such as a voltage regulator. The term power supply in this context refers, for example, to an electrical voltage and/or a current and/or a power which is initially provided by the control device at the interface arrangement with little or no stabilization, and is subsequently provided by the stabilizing device to the processing arrangement in a stabilized manner. In this case, the stabilizing device itself also has a power consumption, so that a very small part of the current is branched off at the interface arrangement and thus at an input of the stabilizing device for the operation of the stabilizing device, and is not available at the output of the stabilizing device for the power supply. Since this portion is very small, the current at the input is approximately equal to the current at the output.

The control device can in particular be designed as a control unit of the vehicle in order to activate a function in the vehicle on the basis of the transmitted information. This function is, for example, an unlocking and/or the triggering of an authentication process at the vehicle. For example, the function is activated as soon as the transmission signal is output.

Conventionally, information may be transmitted by adjusting the current at the interface arrangement, and hence the current at a power supply line of the supply connection, directly by an electronic switch (such as a transistor). This may result in the current intensity of the current being increased to transmit the information, and then decreased again to a level which is sufficient to supply power. However, this current may be low or unstabilized at the power supply line, so that variations in current strength may adversely affect transmission. Further, variations in current may result from a voltage drop across the electronic switch causing variations. In particular, the voltage drop is also temperature dependent. According to the invention, on the other hand, the stabilizing device can be used for outputting the transmission signal, i.e. for adjusting the current on the power supply line.

It may be provided that the stabilizing device is integrated into the component, for example integrated into the door handle electronics. In particular, the stabilizing device is arranged on a common printed circuit board with the processing arrangement. The electrical connections described in the context of the present invention may thereby be provided at least in part by conductive tracks of this printed circuit board.

The power supply may be stabilized by the stabilizing device, for example, by regulating a voltage at the input (input voltage) of the stabilizing device to a predetermined value and outputting it as an output voltage at an output of the stabilizing device. This predetermined value may correspond to the supply voltage for the processing arrangement, in particular for a processing device. In particular, when the input voltage is above the output voltage, the stabilizing device may also be used as a current source and/or controllable current sink, in particular a current regulator. In this case, a current at the output of the stabilizing device may regulate a current at the input of the stabilizing device. Thus, by adjusting the current at the output, the current control arrangement can influence the current at the input, and thus cause and in particular control the output of the transmission signal by the stabilizing device. Preferably if the current control arrangement allows the current at the output to flow across a defined resistance, the current at the input can be precisely defined. In this case, the voltage drop across the resistance can also be considered as defined due to the stabilized output voltage. This makes it possible, from an output state in which only the power supply is established, to apply the transmission signal to the power supply in a defined manner. In this way, the information can be transmitted as at least or exactly a 1-bit information via the power supply line. A protective resistance connected to the input can be adapted such that the input voltage is above the output voltage.

In order to carry out the output of the transmission signal, the described adaptation of the current at the output can preferably be effected by switching a processing device of the processing arrangement. For this purpose, for example, at least one switching device in the form of a port of the processing device, in particular a microcontroller, is used. It is true that this may involve slow switching, which is not suitable for transmitting large amounts of data.

However, switching in this way may be sufficient for the transmission of the information provided, in particular only via a detection of an activation action. Thus, the information may be 1-bit information which merely indicates that the detection has taken place. The information transmission may be implemented as a data transmission in the millisecond range.

The stabilizing device may be designed as a regulator, in particular a voltage regulator. Thus, the stabilizing device may advantageously serve primarily for stabilizing and/or regulating a supply voltage for the power supply of the processing arrangement, in particular processing device. Only secondarily, the stabilizing device can also be used within the scope of the invention for outputting the transmission signal. For this purpose, for example, the output of the stabilizing device can be switched by the current control arrangement to a reference potential, in particular to ground.

The arrangement according to the invention may be designed to be operated in a temperature range of −40° C. and 105° C., preferably −30° C. and 85° C. This enables the use in a vehicle, for example.

It may be envisaged that the current control arrangement does not directly adjust the current at the interface arrangement—and thus at the input of the stabilisation device—but instead adjusts the current at the output of the stabilisation device (and thus without direct coupling to the supply connection). In other words, the current control arrangement may adjust the current at a power supply line of the utility connection indirectly via the stabilizing device to generate the transmission signal at the power supply line.

The current control arrangement can be designed in such a way that it adjusts the current at the output of the stabilizing device in a defined manner. This adjustment also affects the current at the input of the stabilizing device by the function, in particular control, of the stabilizing device. Since the voltage at the output (output voltage) is stabilized by the stabilizing device according to this function, the current can also be defined very precisely by the adjustment of the current control arrangement. In other words, the stabilizing device (already present for stabilizing the power supply) can be used to initiate (in particular generate) on the input side at the stabilizing device a defined current (the transmission signal) for the transmission of the information, in particular by means of a powerline communication. In this context, powerline communication denotes information transmission, in particular data transmission, via an electrical line which is primarily used for power supply. This line can be a power supply line of the supply connection.

Advantageously, the supply connection may comprise a power supply line. Additionally, a ground line of the supply connection may be provided to provide a reference potential for power supply and/or communication. The power supply line may be implemented, in particular in the form of a single electrical conductor or stranded wire or the like, for transmitting a single electrical signal (for communication and/or power supply). In other words, the power supply line may be designed to be at the same potential, i.e. to carry only one same electrical potential at the same time. The electrical signal for power supply, if it is secondarily also used for outputting the transmission signal or for transmitting the information, can also be referred to as a communication signal.

In order to activate the output of the transmission signal, the current control arrangement can pull the output voltage of the stabilizing device to a reference potential (in particular ground potential) via a processing device such as a microcontroller and via at least one defined resistance of a matching arrangement. Since both the output voltage and the resistance can be very precisely defined, this results in a defined current flow (i.e. with a defined current intensity). This current flow is the output current of the stabilizing device, but may be approximately equal to the input current of the stabilizing device (since the current loss through the stabilizing device may be very small). The input current may flow through a power supply line of the supply connection between the control device and the interface arrangement or the input of the stabilizing device. By defining the current, the transmission signal may further be provided.

In the context of the invention, the interface arrangement may denote an electrical connection, but also only a part of an electrical line and/or a current path. In a narrower sense, the interface arrangement corresponds to the input of the stabilizing device, for example in the form of the terminal. In a broader sense, the interface arrangement and the input are arranged in the same current path, wherein a protective resistance and/or a diode arrangement comprising at least one (high-impedance) protective diode may be provided between the interface arrangement and the input, for example. A power supply line of the supply connection can be electrically connected to the interface arrangement, and thus be used simultaneously primarily for the power supply and secondarily for the transmission of the information by means of the transmission signal. For this transmission, i.e. communication, the electrical current on the power supply line can be increased to a predetermined range which allows only a small tolerance (a few mA). A typical current range is, for example, between 18 and 24 mA. This increase of the electric current can be achieved by the defined adjustment by means of the current control arrangement, and then be present when the transmission signal is output via the power supply line. The transmission signal thus corresponds to the current on the power supply line and/or the increase. For example, the power supply line is implemented as a single electrical line, i.e. a single current path.

It is also optionally conceivable that the stabilizing device is designed as a voltage regulator, and is connected via an input to the interface arrangement (and possibly via this to a power supply line and/or the control device) and via an output to the processing arrangement, in order to transmit, in particular convert, an input voltage from the supply connection at the input into a stabilized output voltage for the power supply of the processing arrangement at the output. This makes it possible to use the input voltage for the power supply in a stabilized manner rather than directly. The input voltage can correspond to an electrical voltage on a power supply line or be dependent thereon, the latter in particular if the power supply line is connected to the input via at least one further component such as a protective resistance.

In a further possibility, it can be provided that the current control arrangement has an adaptation arrangement, in particular a resistor arrangement, and at least one switching device for switching at least one electrical current (hereinafter also referred to as transmission current) between an output of the stabilizing device and the adaptation arrangement in order to provide an electrical output current at the output adapted by the adaptation arrangement, in particular so that the stabilizing device uses this electrical output current to output the transmission signal, adapted accordingly, to the interface arrangement via an input of the stabilizing device. This has the advantage that the transmission signal can be precisely defined and thus used in a particularly stable manner for transmitting the information provided.

An output current at the output of the stabilizing device may denote a total current which is present in the current path directly at the output. A part of this total current can then be passed on in the form of the transmission current between the output of the stabilizing device and the adaptation arrangement. Another part (or even the remaining and/or predominant part) can be used for the power supply as supply current. In particular, the transmission current is only forwarded, e.g. switched by the switching device, when the transmission signal is activated, i.e. is to be output. The supply current can remain unchanged by the stabilized output voltage at the output (in particular regulated by the stabilizing device). In this case, the arrangement according to the invention may be designed in such a way that an increase in the total current occurs, which thus leads to an increase in the current intensity. This increase in the current intensity can have a corresponding effect on the input current at the input of the stabilizing device, and thus form the transmission signal.

It is conceivable that the current control arrangement, possibly in conjunction with the stabilizing device, corresponds to a controllable current sink. This current sink can be controlled, for example, by switching the at least one switching device to pick up a defined current for outputting the transmission signal. This recorded current can be understood as the transmission signal, in particular if this current has a defined current intensity. The current intensity is stabilized and/or defined, for example, in that the stabilizing device outputs a stabilized and/or defined output voltage at the output, and the current intensity is dependent on the output voltage and the matching arrangement. For example, a respective resistor of the matching arrangement forms a mesh with the output for this purpose. Thereby, the at least one switching device may be connected to the output such that the switching device switches a current flow (transfer current) between the output and the matching arrangement in order to control the current sink by this switching. This control of the current sink can correspond to the use, in particular activation and/or driving, of the stabilizing device for outputting the transmission signal.

It is further conceivable that the current control arrangement comprises at least one processing device, in particular a microcontroller, and an adaptation arrangement, in particular a resistor arrangement, in order, for switching an electric current (in particular transmission current) between an output of the stabilizing device and the adaptation arrangement, to connect the output electrically via the adaptation arrangement to a reference potential, in particular in order to provide at the output an electric output current adapted, preferably defined, at least by the matching arrangement, so that the stabilizing device uses this electrical output current to output the transmission signal to the interface arrangement via an input of the stabilizing device, so that the transmission signal is also matched, in particular defined, at least by the matching arrangement, preferably so that the transmission signal is specific for a defined current intensity at the input. Also, the power supply may thereby use a supply current which is conducted from the output to the reference potential.

In order to further improve the output of the transmission signal, a plurality of switching device may also be connected in parallel with the matching arrangement, in particular the resistor arrangement, and/or the output of the stabilizing device, if necessary. Accordingly, these switching device may be switched simultaneously to output the transmission signal. The switching device, in particular ports of a processing device, can also be electrically connected to each other in order to conduct in parallel the current (transmission current) from the output via at least one (in particular one each) resistor of the matching arrangement to the reference potential. This has the advantage that the effect of the internal resistance, which is present through the switching device, can be reduced by the parallel connection. The switching device may be formed, for example, as a driver stage in the processing device. The at least one defined resistance of the matching arrangement may, for example, be defined in dependence on the switching device.

Furthermore, it is optionally possible within the scope of the invention for the stabilizing device to be electrically connected to the interface arrangement via an input and to the processing arrangement via an output, in particular to transfer an input voltage from the supply connection at the input into a stabilized output voltage for powering the processing arrangement at the output. This electrical connection may also be used to provide, defined by an output electrical current (total current) at the output, an electrical current at the input specific to the transmission signal. In this context, the current control arrangement may comprise at least one processing device and a matching arrangement, in particular a resistor arrangement, in order, initiated by the processing device, to electrically connect the output to a reference potential via the matching arrangement in order to provide the electrical output current defined by means of the matching arrangement and the output voltage, so that, in particular, the stabilizing device outputs the transmission signal at the input for the interface arrangement (and thus also for the control device) defined by this electrical output current, so that the transmission signal may also be defined by means of the matching arrangement and the output voltage. Thus, a technically simple and accurate definition of the transmission signal is possible.

Furthermore, it is conceivable within the scope of the invention that the stabilizing device is designed to output, activated by the current control arrangement via the interface arrangement, the transmission signal for a power line communication (in particular with the control device) to a power supply line of the supply connection. Thus, the power supply line, and thus also an identical electrical signal at the power supply line, can be used for both power supply and communication. This electrical signal for power supply can thus also be understood as a communication signal, and thus be used simultaneously for different functions.

According to a further possibility, it may be provided that the stabilizing device is adapted to output the transmission signal stabilized at an input, in particular according to and/or in the same way for stabilizing the power supply, preferably stabilizing an output voltage for powering the processing arrangement at an output of the stabilizing device. Thus, the communication can be performed in a much more reliable manner.

Optionally, it may be provided that the current control arrangement comprises a processing device and a matching arrangement in the form of a resistor arrangement, wherein the resistor arrangement comprises at least one resistor which is integrated (as the case may be) in (at least) one current path with (at least) one switching device of the processing device in order to define the transmission signal switched by the switching device. In particular, a respective transmission current can be switched in the associated current path by the switching device. This enables a technically simple control of the communication.

According to an advantageous further development of the invention, it may be provided that the current control arrangement comprises at least one switching device, in particular a processing device comprising the at least one switching device, the at least one switching device being connected to the stabilizing device in order to use, in particular activate, the stabilizing device for outputting the transmission signal to the interface arrangement by switching the switching device, preferably the processing device being connected in parallel with the at least one switching device to the stabilizing device in order to be operated by the power supply. This enables a technically simple control of the communication. In particular, a respective transmission current can be switched by the at least one switching device.

Furthermore, it is conceivable that the current control arrangement has at least two switching device, in particular has a processing device with the at least two switching device, wherein the switching device can each be integrated in a current path with at least one respective resistance of a matching arrangement in order to use, in particular activate, the stabilizing device for outputting the transmission signal to the interface arrangement by switching the switching device jointly and in particular simultaneously, and/or in order to define the transmission signal jointly by the resistances. Thus, an influence of this definition by the internal resistances of the switching device can be reduced.

It may optionally be possible for an output of the stabilizing device to be electrically connected
   with a processing device of the processing arrangement to provide an output current (total current) at the output at least partially for powering the processing device, and also
   with a matching arrangement and at least one switching device of the current control arrangement to adapt the output current at the output in a defined manner for the transmission of the provided information to output the transmission signal.

The processing arrangement may thereby optionally comprise the at least one switching device, and thus also be part of the current control arrangement. This enables simple and reliable control of the communication.

Of further advantage, it can be provided that the stabilizing device is designed to provide an electric current at an input of the stabilizing device predominantly as an electric output current at an output of the stabilizing device, so that an adaptation of the output current by the current control arrangement adapts the current at the input predominantly in the same way, so that the current forms the transmission signal. Thus, it can be defined very precisely by the adaptation in which way the transmission signal is output, and thus can also be received and evaluated by the control device via the supply connection.

Furthermore, it is optionally provided that the processing arrangement comprises a processing device for providing and, in particular, generating the information, the processing device being designed to keep an energy consumption of the processing device constant during the output of the transmission signal, and/or to keep a clock frequency of the processing device constant in order to stabilize the energy consumption of the processing device. On the other hand, outside the output of the transmission signal, the clock frequency may be periodically reduced to reduce the power consumption of the processing device (during the operation of the arrangement). This may provide a further measure to reduce a variation of the electric current at the input of the stabilizing device when the transmission signal is output. This measure may thus concern the definition of the clock frequency of the processing device. For example, when the transmission signal is output, the clock frequency may be kept at a constant value in order to keep the power consumption of the processing device meanwhile also constant. Furthermore, the processing arrangement may be adapted to periodically switch the clock frequency of the processing device to a lower value outside the output of the transmission signal in order to reduce the energy consumption.

Also an object of the invention is a door handle for a vehicle, in particular with an arrangement according to the invention for transmitting information with the door handle, exhibiting
   a processing arrangement for providing information at the door handle, preferably about a detection of an activation action at the door handle, such as an approach to the door handle and/or a gesture,
   an interface arrangement for providing an electrical supply connection to a control device of the vehicle,
   a stabilizing device electrically connecting the interface arrangement to the processing arrangement to provide a power supply from the supply connection stabilized to the processing arrangement,
   a current control arrangement of the processing arrangement, which is electrically connected to the stabilizing device, in order to use the stabilizing device for outputting a transmission signal to the interface arrangement, in particular to activate it in order to transmit the provided information to the control device via the supply connection.

Thus, the door handle according to the invention provides the same advantages as have been described in detail with reference to an arrangement according to the invention. The door handle may, for example, be an external door handle of the vehicle in order to activate a function of the vehicle on the basis of the information (i.e. upon successful detection). This function is, for example, an unlocking of the vehicle and/or an opening of a vehicle door on which the door handle may be arranged.

Also, an object of the invention is a system for a vehicle, comprising at least two components, in particular each in the form of a door handle according to the invention, and each embodied with an arrangement according to the invention. In other words, it is conceivable that several arrangements according to the invention are provided in the system according to the invention, each of which is embodied as part of a respective component. Thus, several components of the vehicle may be provided which communicate with at least one or exactly one control device such as vehicle electronics.

Here, too, it is possible that the information is transmitted by means of a respective transmission signal for communication in each case. If several components are provided, however, it must be possible to distinguish the transmission signals of the different components or the different arrangements of the components. For this purpose, a plurality of current ranges may be provided which are specific to the different components. Depending on the current range in which a transmission signal lies, this can be assigned to a specific component. The current ranges can each correspond to a range of a current intensity within which the transmission signal may vary in order to be able to be assigned to the component of this current range. Thus, in order for a transmission signal to be reliably assigned to a component, the transmission signal must be output stably with a certain current intensity. If the transmission signal indicates, for example, a detection of the activation action, it can be determined at which component the activation action was detected (i.e., the component can be identified) by evaluating the current strength of the transmission signal by the control device. The adjustment of the current intensity of the transmission signal may be performed in each case by the respective current control arrangement of the respective arrangement. In other words, the current control arrangement defines which component is identified on the basis of the transmission signal, in particular by determining the resistance of the respective resistance arrangement.

In a system according to the invention, it may thus be provided that the respective current control arrangement is adapted to use, in particular to activate, the stabilizing device associated therewith for outputting the transmission signal with a respective current intensity predetermined for the component, the current intensities for different ones of the components differing from one another in order to distinguish the transmission signals of the different components from one another at the control device. Here again, the stability of the transmission signal is important. Thus, the system according to the invention brings the same advantages as have been described in detail with reference to an arrangement according to the invention. Moreover, the arrangements of the system may each be configured as the arrangement according to the invention.

It is also an object of the invention to provide a method of transmitting information in a component of a vehicle, in particular by means of an arrangement according to the invention.

Here, it is provided that the following is carried out, preferably one aspect after the other in the order indicated or in any order, wherein individual ones of the aspects can also be carried out repeatedly, if necessary:
- determining information at the component by a processing arrangement of the component, preferably information about a detection of an activation action such as an approach to and/or gesture at the component, in particular to provide the information,
- providing an electrical supply connection from a control device of the vehicle to an interface arrangement of the component,
- stabilizing a power supply from the supply connection for the processing arrangement by a stabilizing device, wherein the stabilizing device can electrically connect the interface arrangement to the processing arrangement, in particular to provide the stabilized power supply at the processing arrangement,
- using, in particular activating and/or driving, the stabilizing device to output a transmission signal to the interface arrangement—and via the supply connection—by means of a current control arrangement of the processing arrangement, which is electrically connected to the stabilizing device for this purpose, in order to transmit the information via the supply connection to the control device.

Thus, the method according to the invention provides the same advantages as have been described in detail with reference to an arrangement according to the invention and/or a system according to the invention and/or a door handle according to the invention. Moreover, the method may be suitable for operating an arrangement according to the invention and/or a system according to the invention and/or a door handle according to the invention.

Figure 5:
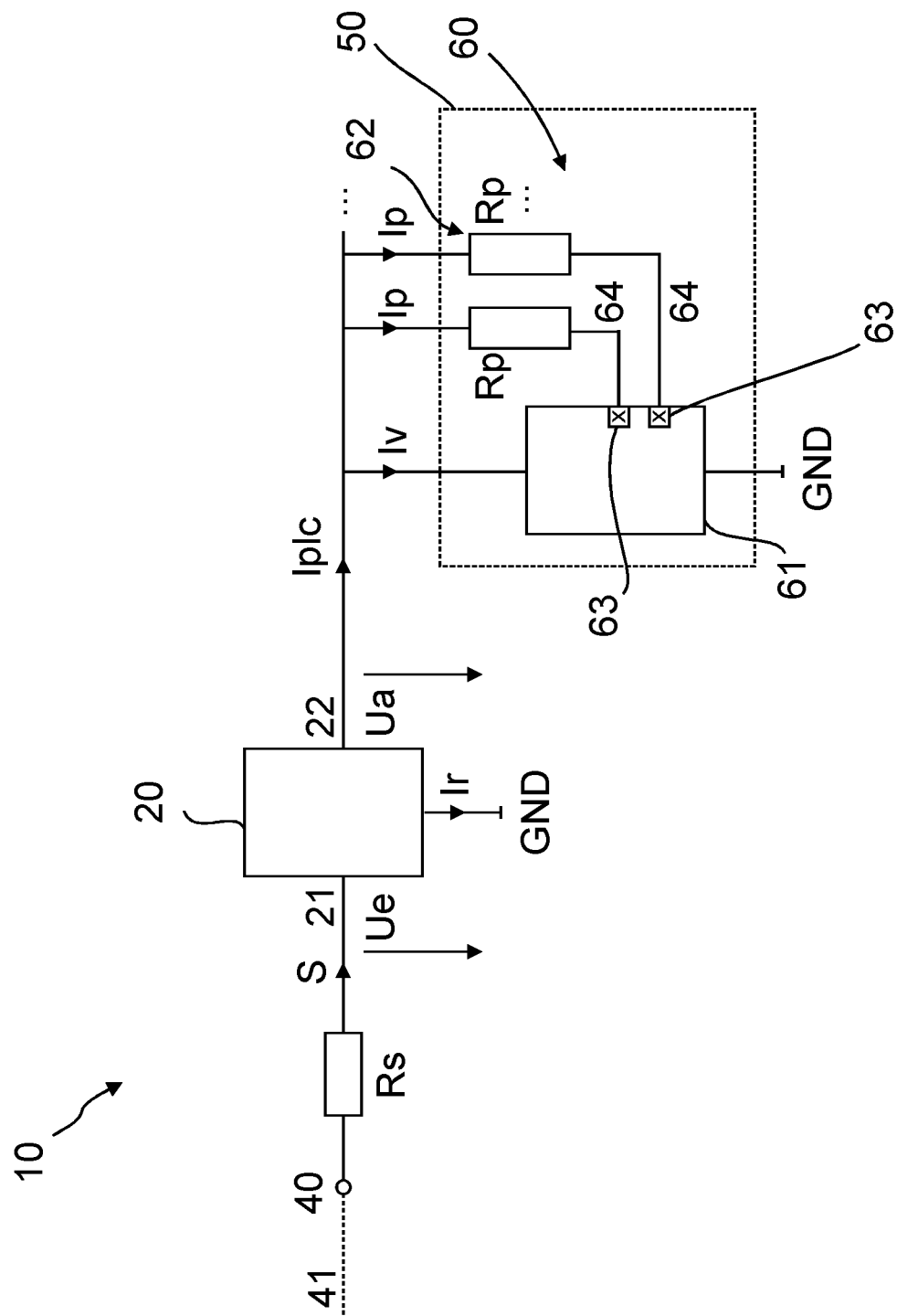
Figure 6:
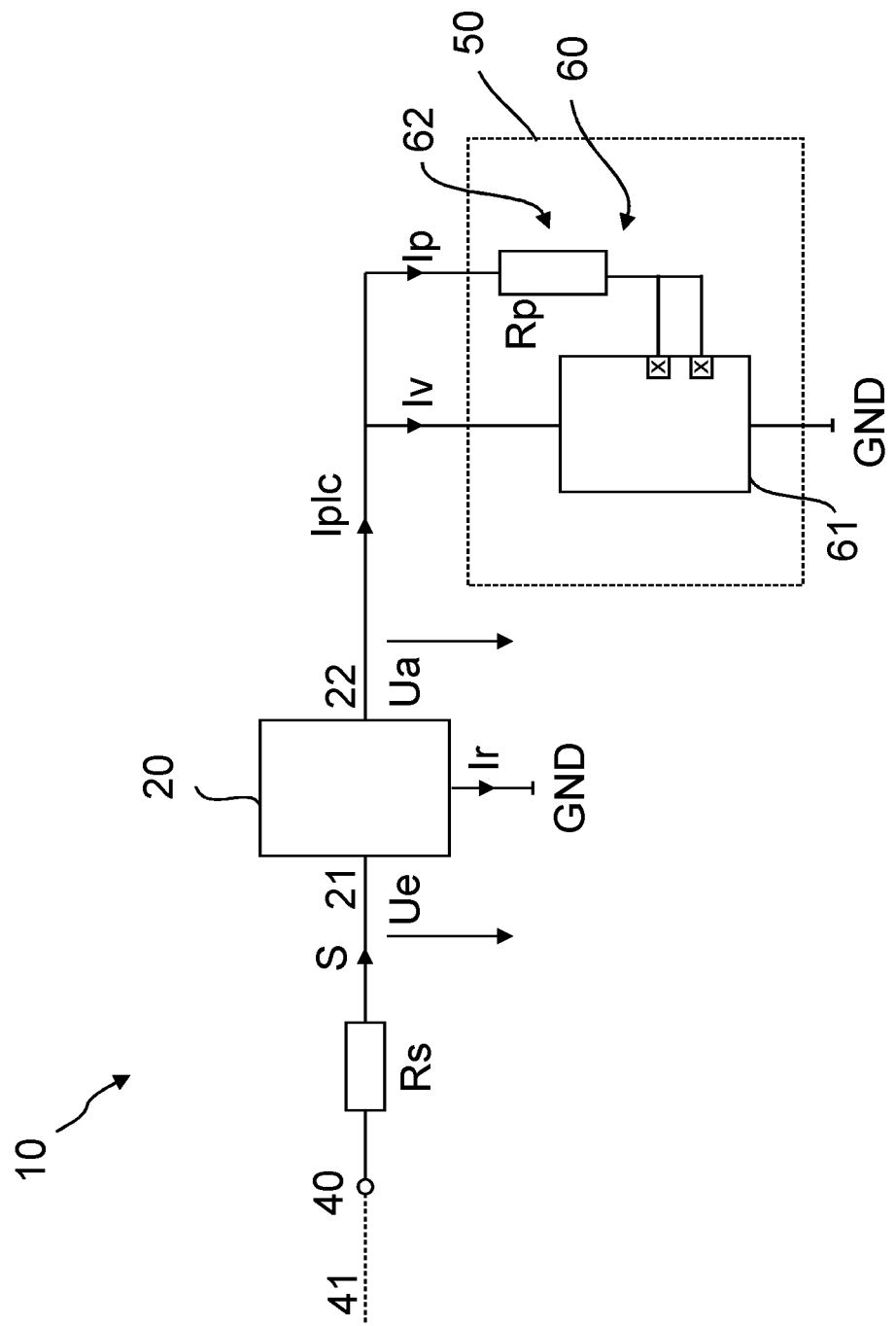
Figure 7:
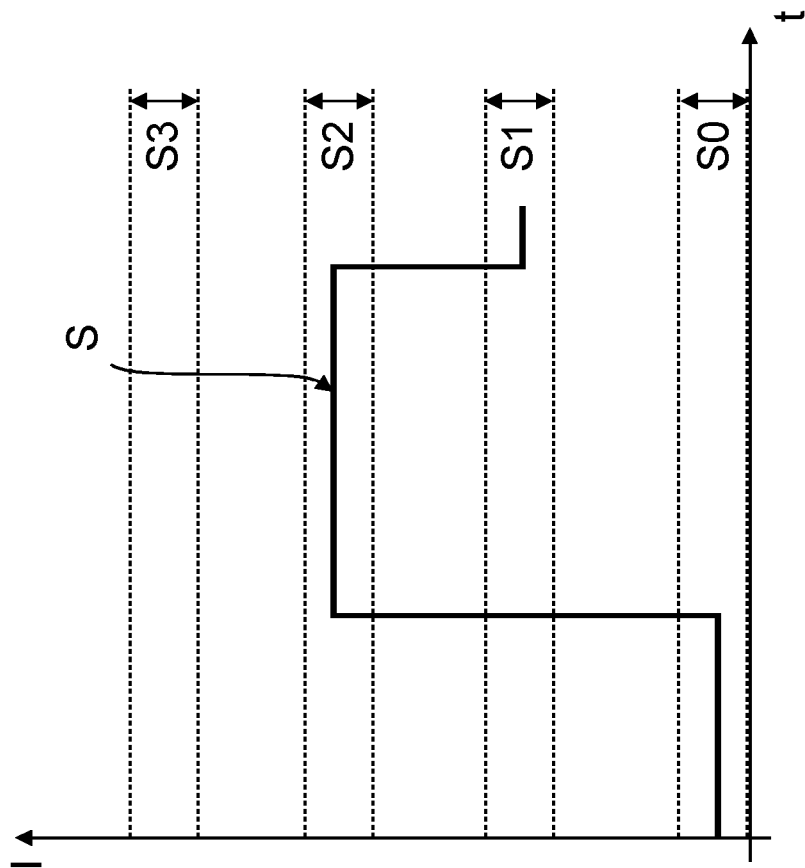
Figure 7:
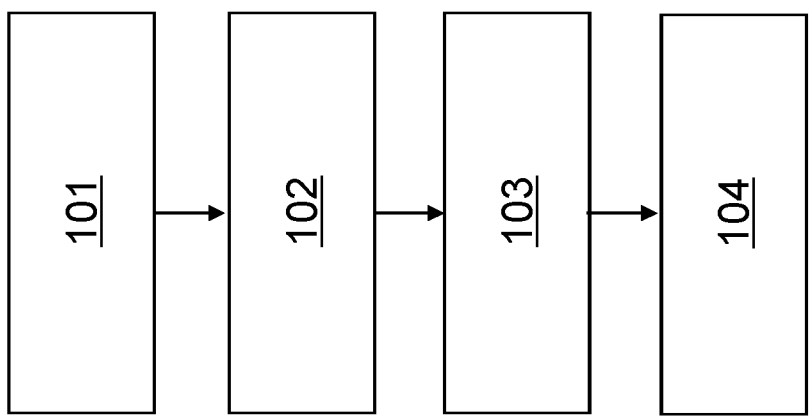
Figure 8:
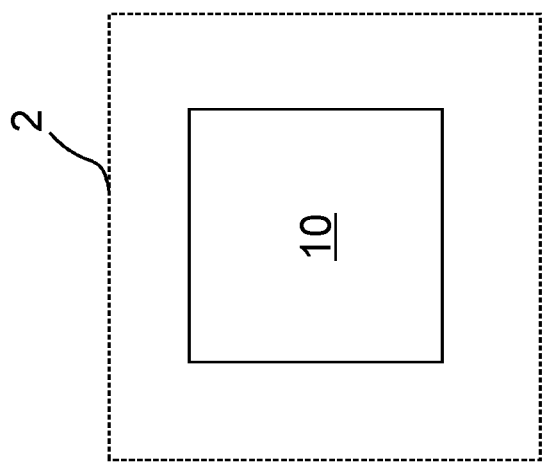
Figure 8:
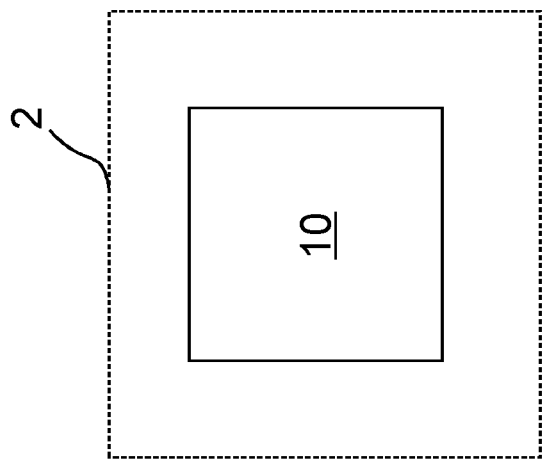

Further advantages, features and details of the invention will be apparent from the following description, in which embodiments of the invention are described in detail with reference to the drawings. In this connection, the features mentioned in the claims and in the description may each be essential to the invention individually or in any combination. Showing:

FIG. 1 a schematic lateral view of a vehicle with a door handle according to the invention and the arrangement according to the invention, FIGS. 2-6 schematic representations of an arrangement according to the invention, FIG. 7 a schematic representation for visualizing a method according to the invention, and a transmission signal output in the process, FIG. 8 a schematic representation of a system according to the invention.

In the following figures, the identical reference signs are used for the same technical features even of different embodiments.

FIG. 1 shows a door handle 2 for a vehicle 1, the vehicle 1 being shown in a side view. The door handle 2 may comprise an arrangement 10 according to the invention, which is electrically supplied with power via a control device 30. Specifically, in this regard, the control device 30 may provide the power supply to the arrangement 10 via a supply connection, as will be further explained below. It is further provided that the arrangement 10 transmits, via the power supply or via the supply connection, information about an activation action at the door handle 2 to the control device 30. This activation action is, for example, an approach to the door handle 2 and/or a gesture in the area in front of the door handle 2 to trigger a function at the vehicle 1 such as an unlocking and/or an authentication.

Figure 2:
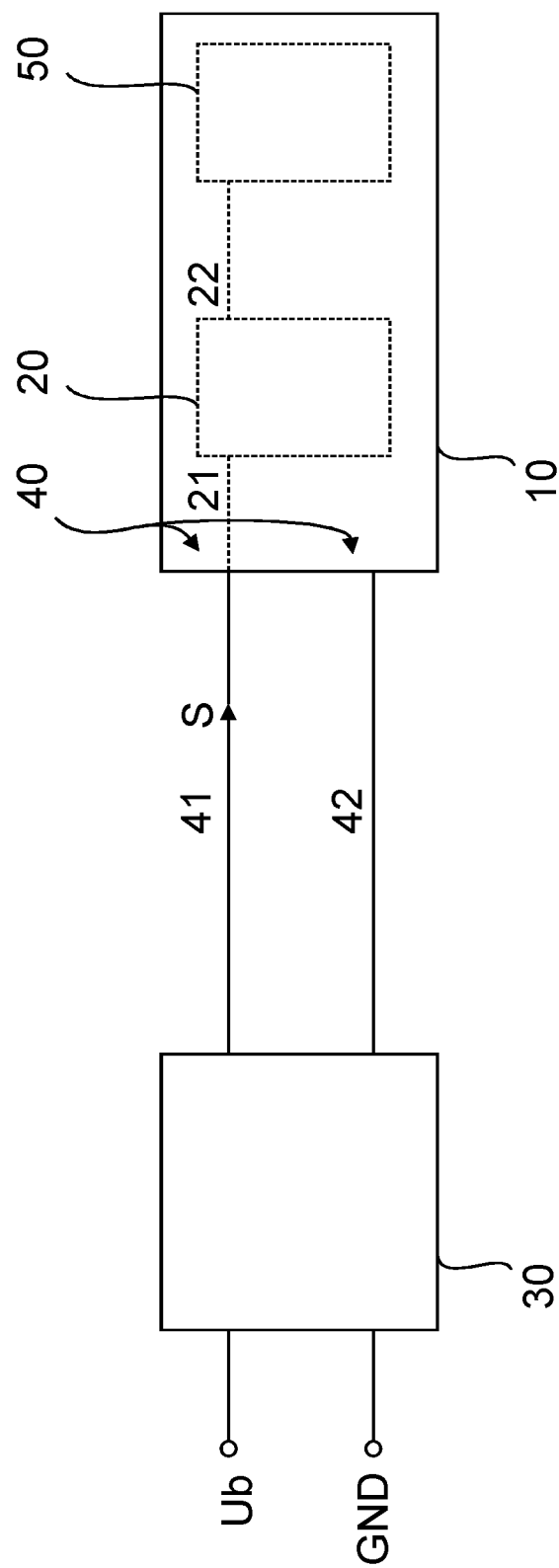

FIGS. 2 to 6 show an arrangement 10 according to the invention for transmitting information to a component 2 of a vehicle 1. The component 2 corresponds, for example, to the aforementioned door handle 2. The arrangement 10 may comprise a processing arrangement 50 for providing information at the component 2, preferably via a detection of an activation action, such as an approach to the component 2. Furthermore, the arrangement 10 may comprise an interface arrangement 40 for providing an electrical supply connection to a control device 30 of the vehicle 1. The interface arrangement 40 may comprise, for example, an electrical connector or terminal or the like. Further, the arrangement 10 may comprise a stabilizing device 20 electrically connecting the interface arrangement 40 to the processing arrangement 50 to provide a (or the) power supply from the supply connection stabilized to the processing arrangement 50. Furthermore, a current control arrangement 60 of the processing arrangement 50 shown in FIGS. 3 to 6 may be provided which is electrically connected to the stabilizing device 20 to use the stabilizing device 20 to output a transmission signal S to the interface arrangement 40, in particular to activate it to transmit the provided information to the control device 30 via the supply connection. The transmission signal S may thereby be further output to the supply connection and to the control device 30 as an information carrier for the provided information via the interface arrangement 40. Specifically, as shown in FIG. 2, the transmission signal S may be transmitted to the control device 30 via a power supply line 41 of the supply connection. The control device 30, such as a control unit 30 of the vehicle 1, may detect the transmission signal S to activate a function for the vehicle 1.

The stabilizing device 20 may be implemented as a voltage regulator 20, and may be connected to the interface arrangement 40 via an input 21 and to the processing arrangement 50 via an output 22 to transfer an input voltage from the supply connection at the input 21 to a stabilized output voltage for powering the processing arrangement 50 at the output 22.

As shown in FIG. 5, the current control arrangement 60 may comprise a matching arrangement 62, in particular a resistor arrangement 62, and at least one switching device 63 for switching at least one electric current Ip between an output 22 of the stabilizing device 20 and the matching arrangement 62, in order to provide an electric output current Iplc at the output 22 matched by the matching arrangement 62, so that the stabilizing device 20 outputs the transmission signal S matched accordingly via an input 21 to the interface arrangement 40 on the basis of this electric output current Iplc. The electrical current Ip, also referred to as the transmission current Ip, may be related to the output current Iplc. In particular, the output current Iplc is a total current Iplc which results at least partially from the (at least one) transmission current Ip and the supply current Iv. Thus, the current control arrangement 60 is also able to influence the output current Iplc via the matching arrangement 62 and the switching device 63 by controlling the transmission current Ip.

In FIG. 2, it is shown that the stabilizing device 20 is electrically connected to the interface arrangement 40 via the input 21 and to the processing arrangement 50 via the output 22. The control device 30 may be adapted to output a voltage from a battery voltage Ub via a power supply line 41. Further, the control device 30 may provide a ground potential GND via a ground line 42. The voltage and the ground potential GND may be provided via the interface arrangement 40 of the arrangement 10 according to the invention. For this purpose, the stabilizing device 20 may be electrically connected to the power supply line 41 via the input 21 and via the interface arrangement 40. In this way, an input voltage Ue can be provided by the power supply connection at the input 21, which is then transferred by the stabilizing device 20 into a stabilized output voltage Ua for powering the processing arrangement 50 at the output 22. In addition, the functionality of the stabilizing device 20 allows an electrical current specific to the transmission signal S to be provided at the input 21 in a manner defined by the electrical output current Iplc at the output 22. For this purpose, the stabilizing device 20 is designed, for example, as a regulator, in particular a voltage regulator.

Figure 3:
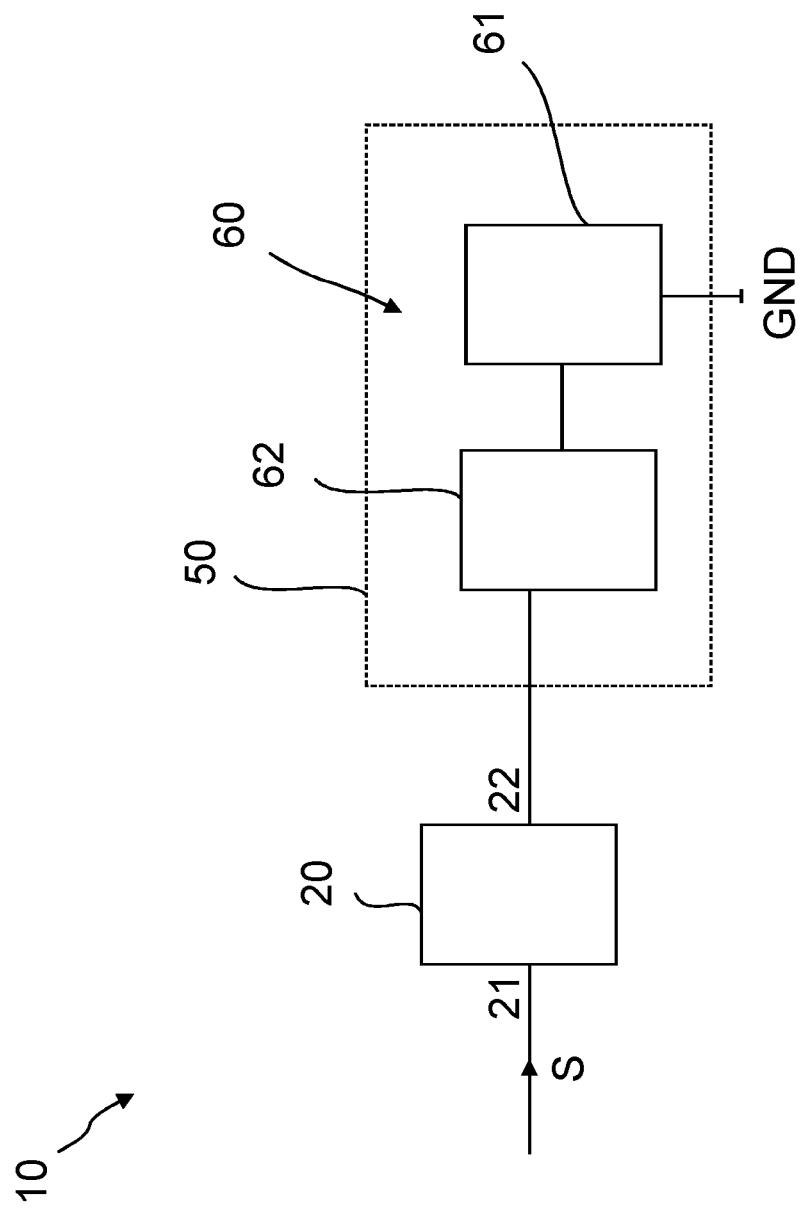
Figure 4:
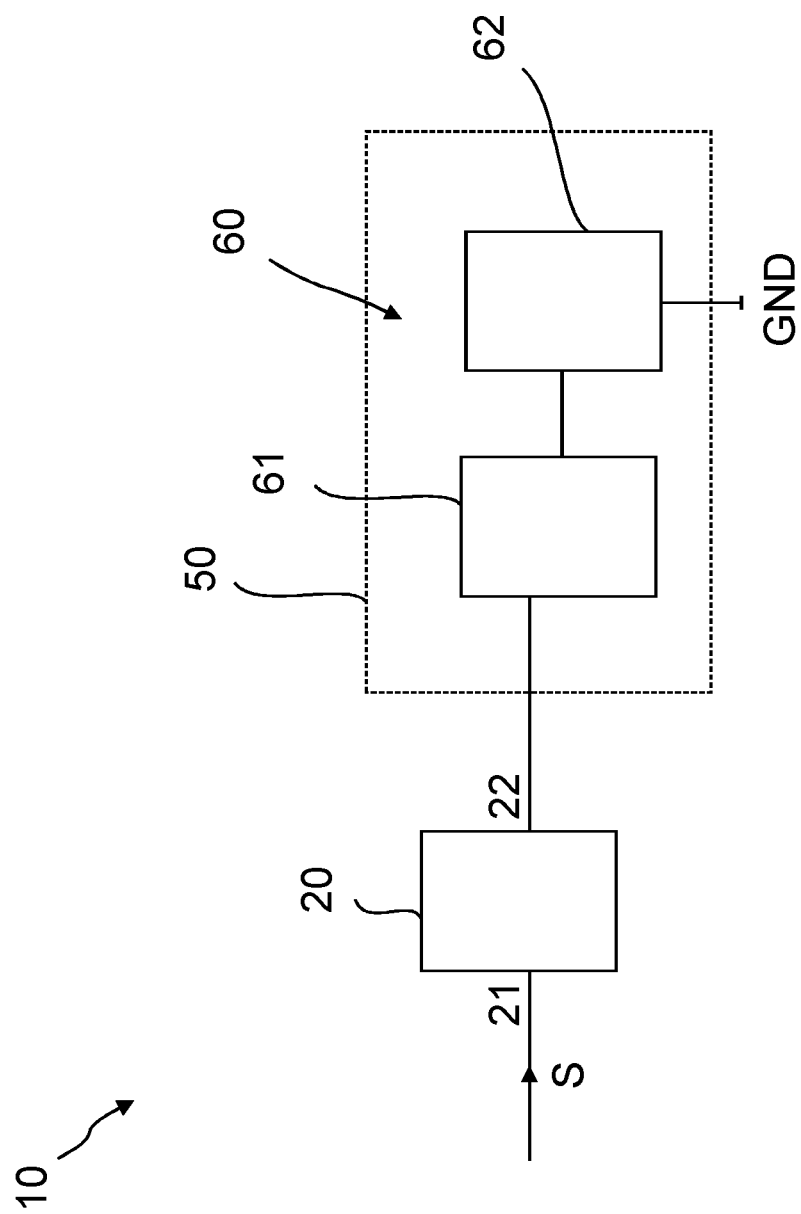

As shown in FIGS. 3 and 4, the current control arrangement 60 may comprise at least one processing device 61 and one matching arrangement 62, in particular resistor arrangement 62, to electrically connect, initiated by the processing device 61, the output 22 to a reference potential GND via the matching arrangement 62. This makes it possible to provide the electrical output current Iplc defined by means of the matching arrangement 62 and the output voltage, so that the stabilizing device 20 outputs the transmission signal S at the input 21 for the interface arrangement 40 defined by this electrical output current Iplc. In this connection, as illustrated by FIG. 3, the output 22 may be connected to the processing device 61 via the matching arrangement 62 and to the reference potential GND via the latter. It is also conceivable that, as illustrated by FIG. 4, the output 22 is connected to the reference potential GND via the processing device 61 and then via the matching arrangement 62.

In FIGS. 5 and 6 it is shown that the current control arrangement 60 comprises the processing device 61 and the matching arrangement 62 in the form of a resistor arrangement 62, in which the resistor arrangement 62 comprises at least one resistance Rp which is (respectively) integrated in a current path 64 with a switching device 63 of the processing device 61 in order to define the transmission signal S switched by the switching device 63. In FIG. 5, the processing device 61 can be seen with at least two switching device 63, each of which is integrated in a current path 64 with a respective resistance Rp of the adaptation arrangement 62, in order to use the stabilizing device 20 to output the transmission signal S to the interface arrangement 40 by switching the switching device 63 together and in particular simultaneously. Thus, the transmission signal S can be defined jointly by the resistances Rp.

Furthermore, it is shown in FIGS. 5 and 6 that the output 22 of the stabilizing device 20 may be electrically connected both to the processing device 61 to provide the output current Iplc at the output 22 at least partially for the power supply of the processing device 61, and to the adaptation arrangement 62 and at least one switching device 63 of the current control arrangement 60 to adapt the output current Iplc at the output 22 in a defined manner for the transmission of the provided information in order to output the transmission signal S. In this regard, the power supply may be provided by a supply current Iv which is branched off from the output current Iplc. Further, the output current Iplc of the stabilizing device 20 may be approximately equal to the input current of the stabilizing device 20 at the input 21 (since the current loss Ir through the stabilizing device 20 may be very small). This input current may correspond to the current of the power supply line 41. A protective resistor Rs or other protective means may be provided between the power supply line 41 and the input 21 to protect the arrangement 10.

FIG. 7 illustrates a method according to the invention. Here, according to a first method aspect 101, an information can be determined at the component 2 by a processing arrangement 50 of the component 2. Then, according to a second method aspect 102, an electrical supply connection can be provided from a control device 30 of the vehicle 1 to an interface arrangement 40 of the component 2. Then, according to a third method aspect 103, a stabilization of a power supply from the supply connection for the processing arrangement 50 may be performed by a stabilizing device 20 electrically connecting the interface arrangement 40 to the processing arrangement 50. According to a further fourth method aspect 104, the stabilizing device 20 is used, in particular activated and/or controlled, to output a transmission signal S to the interface arrangement 40 and via it to the supply connection by a current control arrangement 60 of the processing arrangement 50, which is electrically connected to the stabilizing device 20 for this purpose, in order to transmit the information via the supply connection to the control device 30.

FIG. 8 shows a system according to the invention for a vehicle 1, which can have at least two components 2, in particular door handles 2 according to the invention, each with an arrangement 10 according to the invention. As is also visualized in FIG. 7, the respective current control arrangement 60 may thereby be designed to use the stabilizing device 20 connected thereto for outputting the transmission signal S with a respective current intensity I predetermined for the component 2 (selected, by way of example, from the ranges S1, S2 and S3), the current intensities I for different ones of the components 2 differing from one another in order to distinguish the transmission signals S of the different components 2 from one another at the control device 30. In this regard, the current intensity I may correspond to a current intensity I of a current in the power supply line 41.

FIG. 7 also shows an exemplary progression of the current intensity I of the power supply line 41 and thus of the transmission signal S over the time t. A first communication range S0 can define a current intensity range in which no detection is indicated (idle state, only for power supply). A second communication range S1 may define a current intensity range in which a detection at a first component 2 is indicated by the transmission signal S. A third communication range S2 may define a current intensity range in which a detection at a second component 2 is indicated by the transmission signal S. A fourth communication range S3 may define a current intensity range in which a detection at a third component 2 is indicated by the transmission signal S.

The foregoing explanation of the embodiments describes the present invention solely in the context of examples. Of course, individual features of the embodiments can be freely combined with each other, provided that this is technically useful, without leaving the scope of the present invention.

LIST OF REFERENCE SIGNS

1 Vehicle
2 Component, door handle
10 Arrangement
20 Stabilizing device, voltage regulator
21 Input
22 Output
30 Control device, control unit
40 Interface arrangement
41 Power supply line
42 Ground line
50 Processing arrangement
60 Current control arrangement
61 Processing device, microcontroller
62 Resistance arrangement, matching arrangement
63 Switching device
64 Current path
Iplc Total current, output current
T Time
I current
Ip Transmission current
Ir Current loss controller
Iv Supply current
GND Reference potential, ground potential
Rp Resistance
Rs Protective resistor
S Transmission signal
S0 first communication area
S1 second communication area
S2 third communication area
S3 fourth communication area
Ue Input voltage
Ua Output voltage
Ub Battery voltage

The invention claimed is:

1. An arrangement for transmitting information in a component of a vehicle:
a processing arrangement for providing information at the component,
an interface arrangement for providing an electrical supply connection to a control device of the vehicle,
a stabilizing device electrically connecting the interface arrangement to the processing arrangement to provide a power supply from the supply connection stabilized to the processing arrangement, wherein the stabilizing device is designed to output a transmission signal in a stabilized manner at an input, and
a current control arrangement of the processing arrangement, which is electrically connected to the stabilizing device, for using the stabilizing device to output the transmission signal to the interface arrangement in order to transmit the provided information to the control device via the supply connection.

2. The arrangement according to claim 1,
wherein
the stabilizing device is designed as a voltage regulator and is connected to the interface arrangement via an input and to the processing arrangement via an output in order to transfer an input voltage from the supply connection at the input into a stabilized output voltage for the power supply of the processing arrangement at the output.

3. The arrangement according to claim 1,
wherein
the current control arrangement has a matching arrangement, and at least one switching device for switching at least one electrical current between an output of the stabilizing device and the matching arrangement in order to provide an electrical output current at the output adapted by the matching arrangement, so that the stabilizing device uses this electrical output current to output the transmission signal, adapted accordingly, to the interface arrangement via an input.

4. The arrangement according to claim 1,
wherein
the stabilizing device is electrically connected via an input to the interface arrangement and via an output to the processing arrangement, and to provide defined by an electrical output current at the output an electrical current at the input specific for the transmission signal, wherein
the current control arrangement comprises at least one processing device and a matching arrangement, in order, initiated by the processing device, to electrically connect the output to a reference potential via the matching arrangement to provide the electrical output current defined by the matching arrangement and the output voltage, so that the stabilizing device outputs the transmission signal defined by this electrical output current at the input for the interface arrangement, so that the transmission signal is also defined by the matching arrangement and the output voltage.

5. The arrangement according to claim 4,
wherein
the stabilizing device is electrically connected via an input to the interface arrangement and via an output to the processing arrangement to transfer an input voltage from the supply connection at the input into a stabilized output voltage for the power supply of the processing arrangement at the output.

6. The arrangement according to claim 1,
wherein
the stabilizing device is adapted to output, activated by the current control arrangement via the interface arrangement, the transmission signal for a power line communication to a power supply line of the supply connection.

7. The arrangement according to claim 1,
wherein
said current control arrangement comprises a processing device and a matching arrangement in the form of a resistance arrangement, said resistance arrangement comprising at least one resistance integrated in a current path with a switching device of said processing device for defining said transmission signal switched by said switching device.

8. The arrangement according to claim 1, wherein
the current control arrangement comprises a processing device with at least one switching device, the at least one switching device being connected to the stabilizing device in order to use the stabilizing device for outputting the transmission signal to the interface arrangement by switching the switching device, the processing device being connected in parallel with the at least one switching device to the stabilizing device in order to be operated by the power supply.

9. The arrangement according to claim 1, wherein
the current control arrangement has at least two switching devices which are each integrated in a current path with a respective resistance of a matching arrangement in order to use the stabilizing device for outputting the transmission signal to the interface arrangement by switching the switching device together and, in order to define the transmission signal jointly through the resistances.

10. The arrangement according to claim 1, wherein
an output of the stabilizing device is electrically connected
with a processing device of the processing arrangement to provide an output current at the output at least partially for the power supply of the processing device, and also
comprising an adaptation arrangement and at least one switching device of the current control arrangement for adapting the output current at the output in a defined manner for the transmission of the information provided, in order to output the transmission signal.

11. The arrangement according to claim 1, wherein
the stabilizing device is designed to provide an electric current at an input of the stabilizing device predominantly as an electric output current at an output of the stabilizing device, so that an adaptation of the output current by the current control arrangement adapts the current at the input predominantly in the same way, so that the current forms the transmission signal.

12. The arrangement according to claim 1, wherein
the processing arrangement has a processing device for providing and for generating the information, the processing arrangement being designed to keep an energy consumption of the processing device constant during the output of the transmission signal, and to regularly reduce the clock frequency outside the output in order to reduce the energy consumption of the processing device.

13. The arrangement according to claim 12, wherein
the processing arrangement being designed to keep a clock frequency of the processing device constant in order to stabilize the energy consumption of the processing device.

14. The arrangement according to claim 1, wherein
the stabilizing device is designed to output the transmission signal in a stabilized manner at an input wherein the stabilization of an output voltage for supplying power to the processing arrangement at an output of the stabilizing device.

15. A door handle for a vehicle for transmitting information at the door handle,
comprising
a processing arrangement for providing information at the door handle,
an interface arrangement for providing an electrical supply connection to a control device of the vehicle,
a stabilizing device electrically connecting the interface arrangement to the processing assembly arrangement to provide a power supply from the supply connection stabilized to the processing arrangement, wherein
the stabilizing device is designed to output a transmission signal in a stabilized manner at an input, and
a current control arrangement of the processing arrangement, which is electrically connected to the stabilizing device, for using the stabilizing device to output the transmission signal to the interface arrangement in order to transmit the provided information to the control device via the supply connection.

16. A system for a vehicle, comprising at least two door handles according to claim 15, each with an arrangement for transmitting information in a component of a vehicle, the arrangement comprising:
a processing arrangement for providing information at the component,
an interface arrangement for providing an electrical supply connection to a control device of the vehicle,
a stabilizing device electrically connecting the interface arrangement to the processing arrangement to provide a power supply from the supply connection stabilized to the processing arrangement, wherein
the stabilizing device is designed to output the transmission signal in a stabilized manner at an input, and
a current control arrangement of the processing arrangement, which is electrically connected to the stabilizing device, for using the stabilizing device to output a transmission signal to the interface arrangement in order to transmit the provided information to the control device via the supply connection;
wherein the respective current control arrangement is adapted to use the stabilizing device connected thereto to output the transmission signal with a respective current intensity predetermined for the component, the current intensities for different ones of the components differing from each other in order to distinguish the transmission signals of the different components from each other at the control device.

17. A method for transmitting information in a component of a vehicle whereby the following are carried out:
determining information at the component by a processing arrangement of the component,
providing an electrical supply connection from a control device of the vehicle to an interface arrangement of the component,
stabilizing a power supply from the power supply connection for the processing arrangement by a stabilizing device electrically connecting the interface arrangement to the processing arrangement, and
outputting a transmission signal to the interface arrangement in order to transmit the information to the control device via the supply connection by the stabilizing device and a current control arrangement of the processing arrangement, the current control arrangement electrically connected to the stabilizing device, wherein the stabilizing device outputs the transmission signal in a stabilized manner at an input.

\* \* \* \* \*